United States Patent [19]

Hams

[11] 4,442,347
[45] Apr. 10, 1984

[54] INDICIA READING METHOD AND APPARATUS

[75] Inventor: Kenneth A. Hams, Easton, Pa.

[73] Assignee: Bell & Howell Company, Phillipsburg, N.J.

[21] Appl. No.: 297,534

[22] Filed: Aug. 31, 1981

[51] Int. Cl.³ .......................................... G06K 7/016
[52] U.S. Cl. ..................................... 235/474; 235/375
[58] Field of Search ............................... 235/474, 375

[56] References Cited

U.S. PATENT DOCUMENTS

| | | | |
|---|---|---|---|
| 3,242,318 | 3/1966 | Guiuer | 235/474 |
| 3,586,833 | 6/1971 | Schafer | 235/474 |
| 3,627,990 | 12/1971 | Sallach | 235/474 |
| 3,831,009 | 8/1974 | McMillin | 235/474 |
| 3,935,429 | 1/1976 | Branecky | 235/474 |
| 4,114,031 | 9/1978 | Bushman | 235/474 |
| 4,117,975 | 10/1978 | Gunn | 235/375 |
| 4,205,781 | 6/1980 | Baader | 235/474 |
| 4,298,859 | 11/1981 | Feilchenfeld | 235/474 |

*Primary Examiner*—Harold Pitts
*Attorney, Agent, or Firm*—Griffin, Branigan & Butler

[57] ABSTRACT

A voltage signal is generated in proportion to the speed of travel of a document travelling through a read station of a document handling machine. The voltage signal is converted to a digital signal having a pulse frequency proportional to the speed of the document. The pulses are counted as an indication of the number of print lines that are passing by the read station. The count is then compared to a pre-selected value approximating the number of print lines typically separating an indicia field of similar documents from a leading edge thereof. When the counted and pre-selected numbers are equal, a reading probe seeks a gate mark within a predetermined number of subsequent print lines. Once the gate mark is located, a variable number of consecutive print line positions comprising the indicia are read.

23 Claims, 9 Drawing Figures

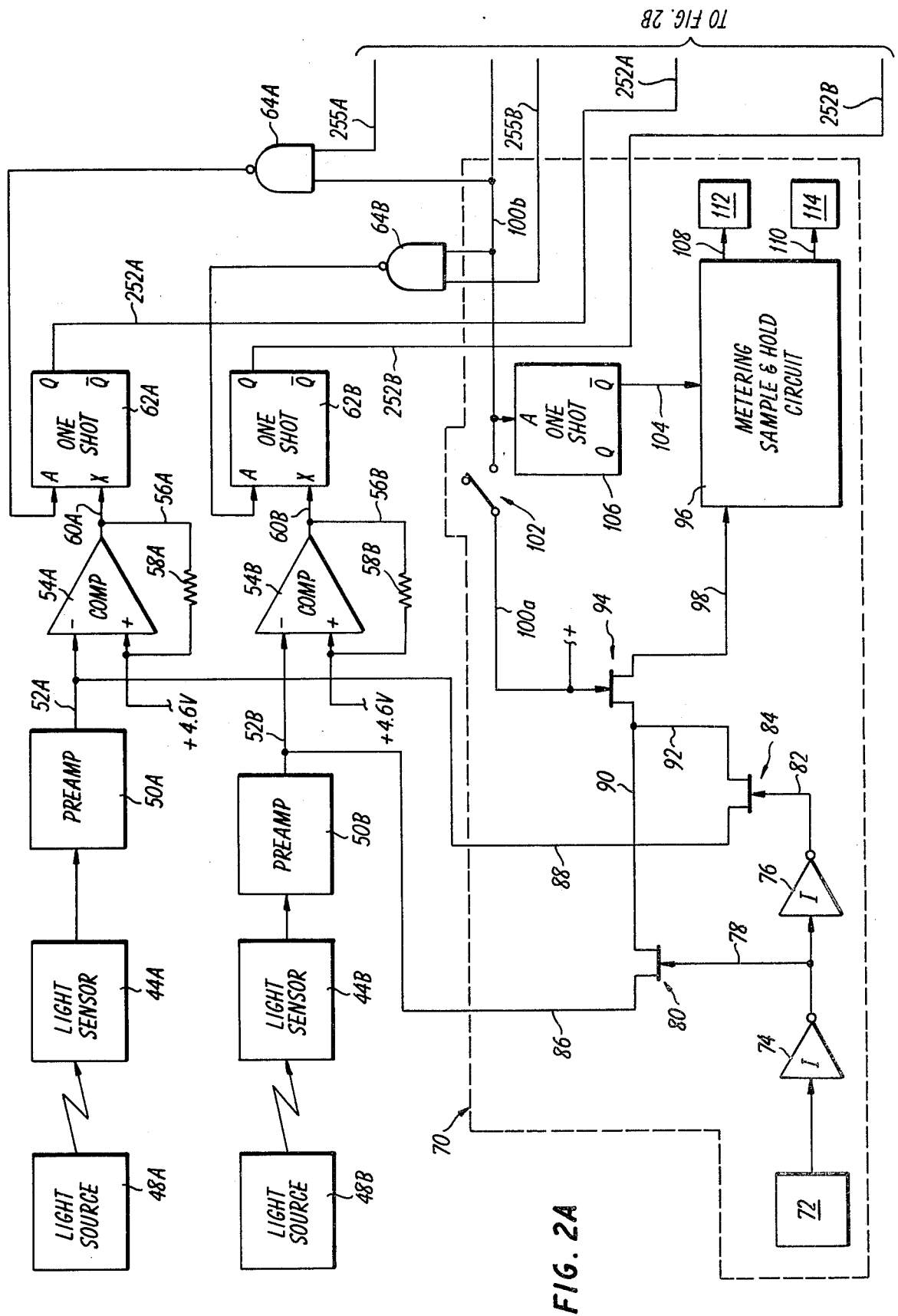

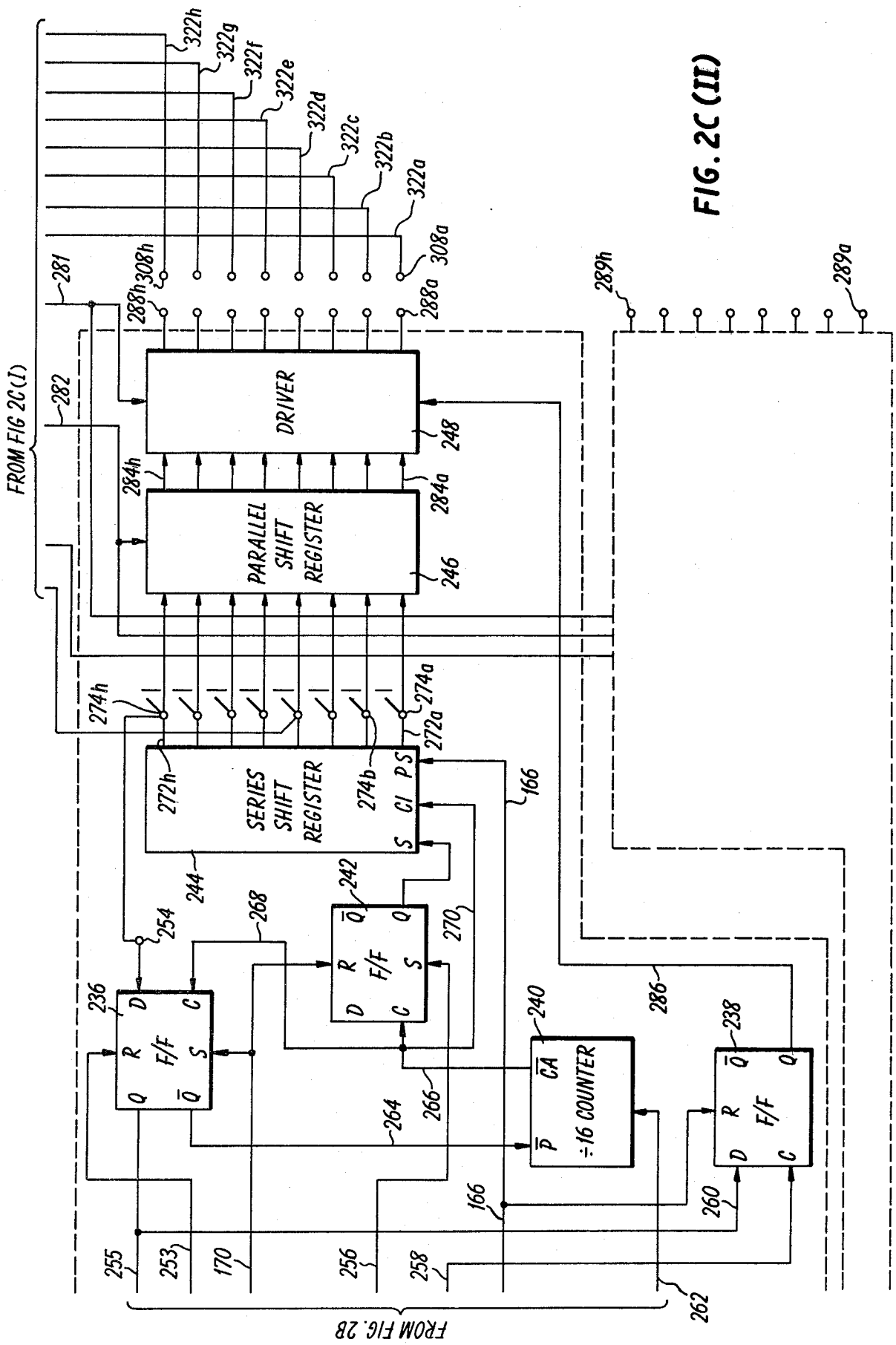

INDICIA READING METHOD AND APPARATUS

BACKGROUND

This invention pertains to methods and apparatus for reading codes, indicia or the like, and particularly to such methods and apparatus as are employed in conjunction with document handling machines.

Document handling machines, such as document insertion machines, for example, have a vast number of documents travelling or conveyed therethrough. Document handling machines may perform various operations in connection with the documents passing therethrough, such as grouping related documents together; inserting related documents in an envelope; and, affixing postage to envelopes.

Many document handling machines read or scan a code or an indicia on a document passing therethrough in order to discern what operation(s) are to be performed with respect to the document. In this regard, each document typically has thereon a particular field wherein the code or indicia lies. The location of such a field on documents for a single batch is generally the same, but may vary for documents of different batches.

In the above regard, the code or indicia in the field often comprises a plurality of mark positions, each position being associated with a particular operation of the document handling machine such that the presence or absence of a mark in the mark position indicates whether the operation is to be performed. The mark positions are usually spaced apart from one another in a known, readable format.

When documents bearing indicia or codes as described above have already been separated, such as by a burster, for example, and are not travelling in a substantially continuous web, it is often difficult to determine when a document is in a position to be read. Moreover, once the document is in the vicinity of a reading means or the like, it is particularly difficult to determine when the field containing the indicia is precisely situated so that the reading may commence. If the indicia comprises a pre-designated sequence of mark positions each associated with a particular machine operation, the reading means must know where to look for each mark position. Further, the document handling machine must keep track of and correctly apply to its associated elements the signals generated with respect to each mark position.

Therefore, an object of this invention is the provision of a method and apparatus for correctly determining when an indicia-bearing portion of a travelling document is in a position to be read by a document handling machine.

An advantage of this invention is the correct correlation of mark positions within an indicia field with particular machine operations associated therewith, and the capability of interchanging the mark position and associated operations for different type documents being processed by a document handling machine.

A further advantage of the invention is the provision of display means for providing an indication operator of the indicia being read.

SUMMARY

In an apparatus and method for reading indicia on documents travelling past a read station, the presence of a document is first detected in the read station. A digital signal having a pulse frequency proportional to the speed of travel of the document is then generated using a tachometer coupled to a voltage frequency converter. The generated digital pulses are counted as an indication of the number of document print lines having passed through the read station.

In order to determine when an indicia-bearing portion of the travelling document is in a position to be read, the pulse count is compared to a variable, preselected input value approximating the distance in print lines from an edge of the document to a field in which indicia typically reside for similar documents. At this point a pre-determined number of successive print lines of the document are read in order to detect the first mark, or gate mark, of an indicia field comprising a plurality of mark positions.

Once the beginning of an indicia field is located, a pre-selected number of successive print lines included in the indicia field are counted and read. The indicia comprises a plurality of potential mark positions, each mark position being associated with an operation of a document handling machine. In reading the indicia, the presence or absence of a mark is noted for each mark position. Digital signals corresponding to each mark position are sequentially stored and applied to associated elements of the document handling machine to enable the machine to carry out subsequent operations on the documents.

The apparatus is adaptable to read different batches of documents, the documents of one batch having indicia thereon at a different location than documents in another batch. In this respect, controls on an operator's console permit the passage through the read station of a selectable number of document print lines before detection of the indicia is commenced. Moreover, the apparatus permits a mark position to correspond to a first machine operation for one batch of documents and another machine operation for another batch of documents.

In one embodiment of the apparatus rollers are utilized to impart motion to the travelling documents. A tachometer is used to determine the rotational velocity of the rollers as an approximation of the speed of travel of the documents. A potentiometer provides a means of calibrating the tachometer signal for taking into consideration changes in the roller diameter due to wear, ink build-up, or other pertinent factors.

The apparatus also analyzes the readability (print darkness) of the indicia, and provides a display indicative of the readability as well as a display showing what mark positions actually contain marks and which do not.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIGS. 2A, 2B, and 2C(I), 2C(II) are inter-related circuit diagrams illustrating electrical circuitry comprising an embodiment of the invention;

DETAILED DESCRIPTION OF THE DRAWINGS

Figure 5:
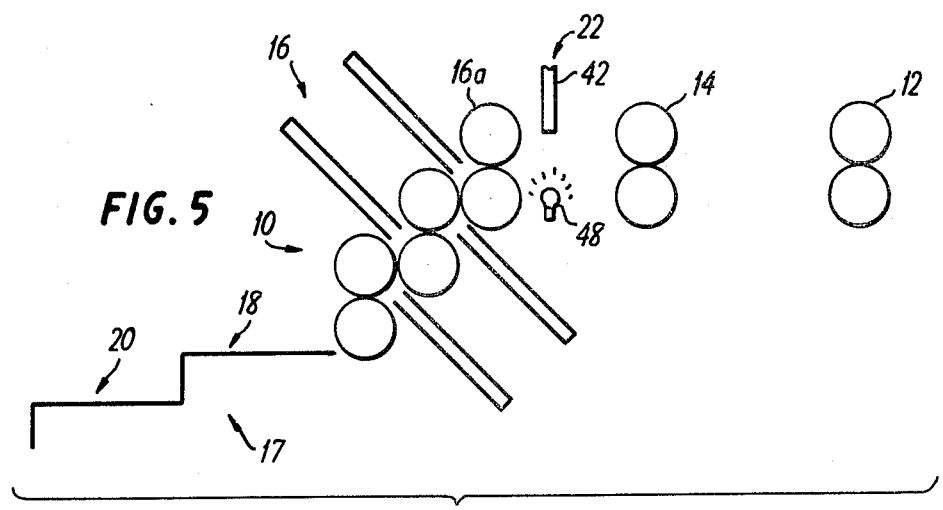
FIG. 5 is a schematic view of a document handling machine of a type with which an indicia reading apparatus is operable; and, FIG. 6 is a circuit diagram illustrating electrical circuitry dipicting an embodiment of a circuit subelement comprising FIG. 2B.

FIG. 5 is a schematic illustration of a document handling machine 10 such as the type disclosed in co-pending U.S. Pat. application Ser. No. 297,536 filed by Hams and incorporated herein by reference. The document handling machine 10 is a document insertion machine basically comprising means 12,14 for imparting motion to documents travelling therethrough (such as input rollers 12 and burster rollers 14); document folding means (such as buckle folder 16 including a first pair 16a of folder rollers); and, a collector assembly 17 (comprising an upper collector assembly 18 and a lower collector assembly 20). A read station 22 is positioned downstream from the burster rollers 14 but before the folder 16.

Figure 1:
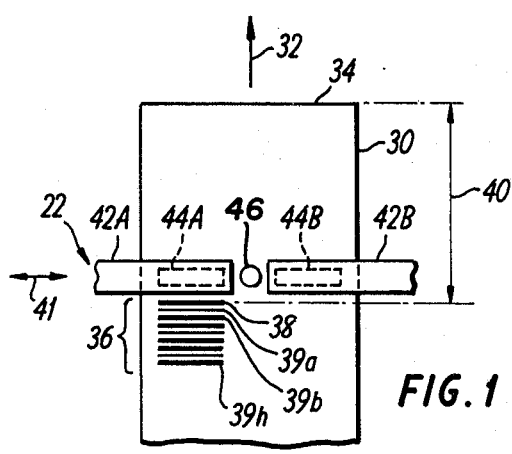
FIG. 1 is a schematic view of a document travelling through a read station of an indicia reading apparatus according to an embodiment of the invention.
Figure 3:
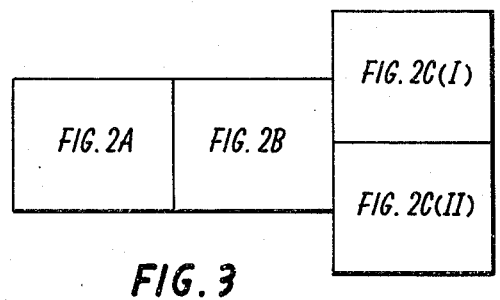
FIG. 3 is a schematic diagram showing the relationships of FIGS. 2A, 2B, and 2C(I), 2C(II) to one another.

FIG. 1 shows a document 30 travelling in a direction indicated by arrow 32 through the document handling machine of FIG. 5. As shown in FIG. 1, the document 30 is in the vicinity of the read station 22. Document 30 has a leading edge 34 which precedes it through the document handling machine. The document 30 has thereon a plurality of print lines each of which extends across the document 30 and is parallel to the leading edge 34. For purposes of the ensuing discussion, the document 30 described herewith has either six or eight print lines per inch.

Each document 30 has thereon an indicia field 36. The indicia field 36 comprises segments of a plurality of successive print lines on the document 30. The leading segment has an initial information mark, or gate mark 38. Some of the remaining segments (labeled 39a–39h) in the indicia field 36 contain information marks, while other segments do not. For example, in segment 39a an information mark is absent while in 39b an information mark is present. As seen hereinafter, each of the indicia segments 39 are associated with operational parameters of the document handling machine 10 and are read to provide an indication to the document handling machine of subsequent operations that must be performed with respect to each document 30.

The gate mark 38 on document 30 is separated from the leading edge 34 of the document by a distance 40 which is measured in print lines. Inasmuch as the document handling machine facilitates the processing of different batches of documents, a document 30 belonging to one batch may have a distance 40 measuring four print lines, for example, while a document 30' associated with another batch may have a distance 40' measured at ten print lines.

FIGS. 1 and 5 illustrate a read station 22 used in conjunction with a document handling machine 10. The read station 22 comprises two probes 42A and 42B which are positioned above the document 30. The probes 42 are positioned end-to-end so that substantially the entire width of the document 30 is under a portion of either probe. The probes are adjustably mounted above the document 30 so that they may be moved in the direction of arrow 32 or, if desired, laterally in the direction of arrow 41.

Each probe 42 has a reflective photoelectric scanner 44 mounted on its underside. The photoelectric scanners 44 are positioned approximately one-half inch above the document 30 and are of any suitable commercially available type, such as model PL-20 available from Frost Controls. The photoelectric scanner 44 is adapted to read the indicia 36 as the document 30 passes through the read station 22. The photoelectric sensor 46 is used to detect the presence of the document 30 in the read station 22 and is deactivated as soon as the leading edge 34 of the document 30 interrupts the path of radiant energy between the source 48 and the sensor 46.

FIG. 2A illustrates electrical circuitry associated with the reading station 22. The existence of the two probes 42A and 42B facilitate the reading of indicia 36 by either a channel A associated with probe 42A or a channel B associated with probe 42B. As described above, each channel has associated therewith a radiant energy source 48 emitting radiant energy upon a photoelectric sensor 44. The electrical signal produced by the sensor 44 for each channel is applied to a suitable preamplifier 50 for amplification, after which the amplified signal is applied over a lead 52 to a negative-going terminal of a comparator 54. The positive going terminal of the comparator 54 is set to approximately 4.6 volts, so that any negative going signal less than 4.6 volts will provide a high signal at the comparator 54 output terminal. A lead 56 with a resistor 58 thereon (having a value approximately 100K) connects the output terminal of the comparator 54 to its positive-going input terminal.

The output terminal of each comparator 54 is connected by a lead 60 to a first input terminal of a one-shot multivibrator 62. A second input terminal of the one-shot 62 is connected to an output terminal of a NAND gate 64. For purposes of the preceding discussion, it should be understood that a comparator 54, a one-shot 62, and a NAND gate 64 exist for each of the channels A and B.

FIG. 2A also illustrates a metering circuit 70 (framed by broken lines) which receives a signal at connector 72 from a subsequently-described switch included with an operator's console 73. The signal at connector 72 is first applied to an inverter 74 and, after inversion, is applied to a second inverter 76. A lead 78 is connected from the output terminal of the inverter 74 to a first analog switch 80. A lead 82 is connected from the output terminal of the inverter 76 to a second analog switch 84. A terminal of the analog switch 80 is connected by a lead 86 to the output terminal of the preamplifier 50B. Similarly, a terminal of the analog switch 84 is connected by lead 88 to the output terminal of the preamplifier 50A. Second terminals of the analog switches 80 and 84, respectively, are connected by corresponding leads 90 and 92 to a first terminal of a third analog switch 94. A second terminal of the analog switch 94 is connected to a metering sample and hold circuit 96 (further described hereinafter with reference to FIG. 4) by a lead 98. The analog switch 94 is connected to a lead 100 which has a selectively actuated switch 102 thereon. In this respect, a segment of the lead 100 intermediate the switch 102 and the switch 94 is labeled 100a; a segment of the lead on the other side of the switch 102 is labeled 100b.

As indicated above, the metering sample and hold circuit 96 is connected by lead 98 to the analog switch 94. Circuit 96 is also connected by lead 104 to a $\overline{Q}$ output terminal of a one-shot miltivibrator 106. An input terminal to the one-shot 106 is connected to the lead 100b. As detailed hereinafter, circuit 96 is also connected by leads 108 and 110, respectively, to an operator's console 73 through connectors 112 and 114.

Figure 2B:
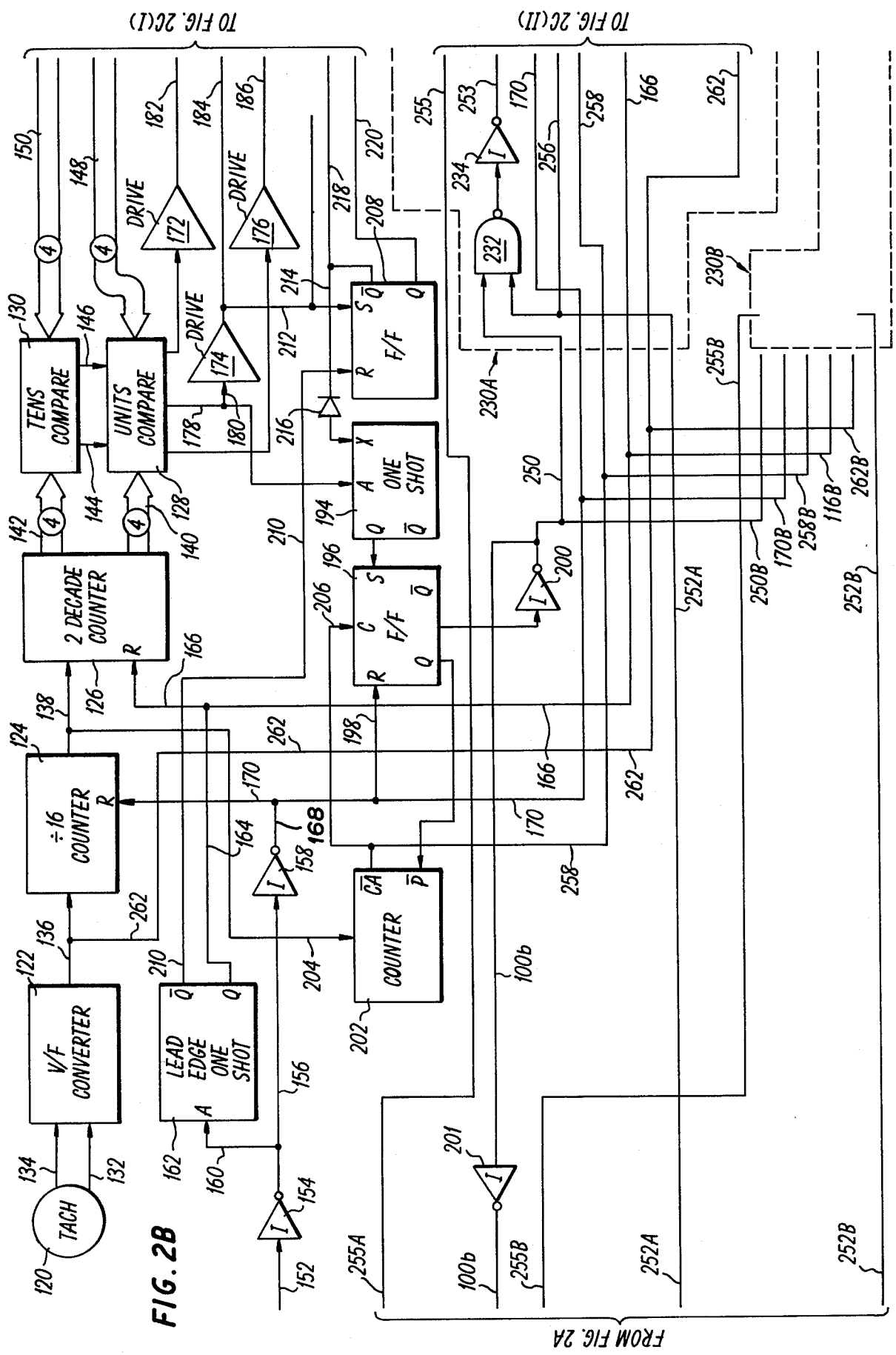

The circuit of FIG. 2B includes a tachometer 120; a voltage to frequency converter 122; counting means (comprising a divide-by-sixteen counter 124 and a two decade counter 126); and, comparison means 128 (a "units" comparator) and 130 (a "tens" comparator). In this respect, the tachometer 120 is mounted so as to be surface driven by the folder roller 16a. Two leads 132,134, connect the tachometer 120 to the voltage to frequency converter 122. An output terminal of the converter 122 is connected by a lead 136 to an input terminal of the divide-by-sixteen counter 124. An output terminal of the counter 124 is connected by lead 138 to an input terminal of the two decade counter 126. Two busses 140,142, each comprising four leads, connect the counter 120 to the comparison means. In this respect, bus 140 connects the counter 126 to the comparator 128 and bus 142 connects the counter 126 to the comparator 130. The comparator 130 is connected to the comparator 128's "equal to" condition terminal by a lead 144 and to the comparator 128's "greater than" condition terminal by a lead 146. As seen hereinafter, the comparator 128 is connected to the operator's console 73 by a four-lead bus 148 and the comparator 130 by a four-lead bus 150.

FIG. 2B also illustrates a lead 152 which connects a means for detecting the presence of a document in the read station (such as sensor 46 of FIG. 1) to an inverter 154. The output terminal of the inverter 154 is connected by a lead 156 to a second inverter 158 and by a lead 160 to an input terminal of a leading-edge one-shot multivibrator 162. The Q output terminal of the one-shot 162 is connected through leads 164 and 166 to a reset terminal R of the decade counter 126. The output terminal of the inverter 158, on the other hand, is connected through leads 168 and 170 to the reset terminal R of the divide-by-sixteen counter 124.

FIG. 2B also includes three drivers 172, 174, and 176. The driver 172 is connected to a terminal of the comparator 128 which is activated when the numerical number represented by the signals on busses 140 and 142 is less than the numerical number represented by the signals on bus 148 and 150. Likewise, driver 176 is connected to a terminal of a comparator 128 which is activated when the number represented by the signals on the busses 140 and 142 is greater than the number represented by the signals on the busses 148 and 150. When the numbers represented by the signals supplied to comparator 128 by busses 140 and 142 and 148 and 150 are the same, driver 194 is activated by a signal on leads 178 and 180 which connect the driver to comparator 128. Drivers 172, 174, and 176 are connected by leads 182, 184, 186, respectively to indicator lamps 188, 190, and 192, respectively (see FIG. 2C) on the console 73.

Returning to FIG. 2B, the "equal to" condition terminal of the "units" comparator 128 is connected by the lead 178 to a first input terminal of a one-shot multivibrator 194. The Q output terminal of the one-shot 194 is connected to the set terminal S of a flip-flop 196. The reset terminal R of the flip-flop 196 is connected by leads 198, 170 and 168, to the output terminal of the inverter 158. The $\overline{Q}$ output terminal of flip-flop 196 is connected to an inverter 200 whose output terminal, in turn, is connected by the aforementioned lead 100b through an inverter 201 and to the metering circuit 70 as described above. The Q output terminal of the flip-flop 196 is connected to a low-activated terminal on a counter 202. In this regard, although the details of the connections are not fully described herein, it should be understood that the counter 202 can count up to 16 but is connected to commence counting at 13 and to continue, if permitted, to 14, 15 and 16. In this respect, the counter 202 is incremented by a signal applied thereto on a lead 204 which connects the counter 202 to the output terminal of the divide-by-sixteen counter 124. A "carry" terminal of the counter 202 is connected by a lead 206 to an input terminal of the flip-flop 196.

FIG. 2B further illustrates that a flip-flop 208 has a first input terminal connected by a lead 210 to the terminal $\overline{Q}$ of the leading edge one-shot 162. A second input terminal of a flip-flop 208 is connected by a lead 212 to the output terminal of the driver 174. A first output terminal of the flip-flop 208 is connected by a lead 214 (with a diode 216 thereon) to a second input terminal of a one-shot 194. The first output terminal of the flip-flop 208 is also connected by a lead 218 to the operator's console 73. A second output terminal of the flip-flop 208 is connected by a lead 220 to the operator's console 73.

Figure 2C:
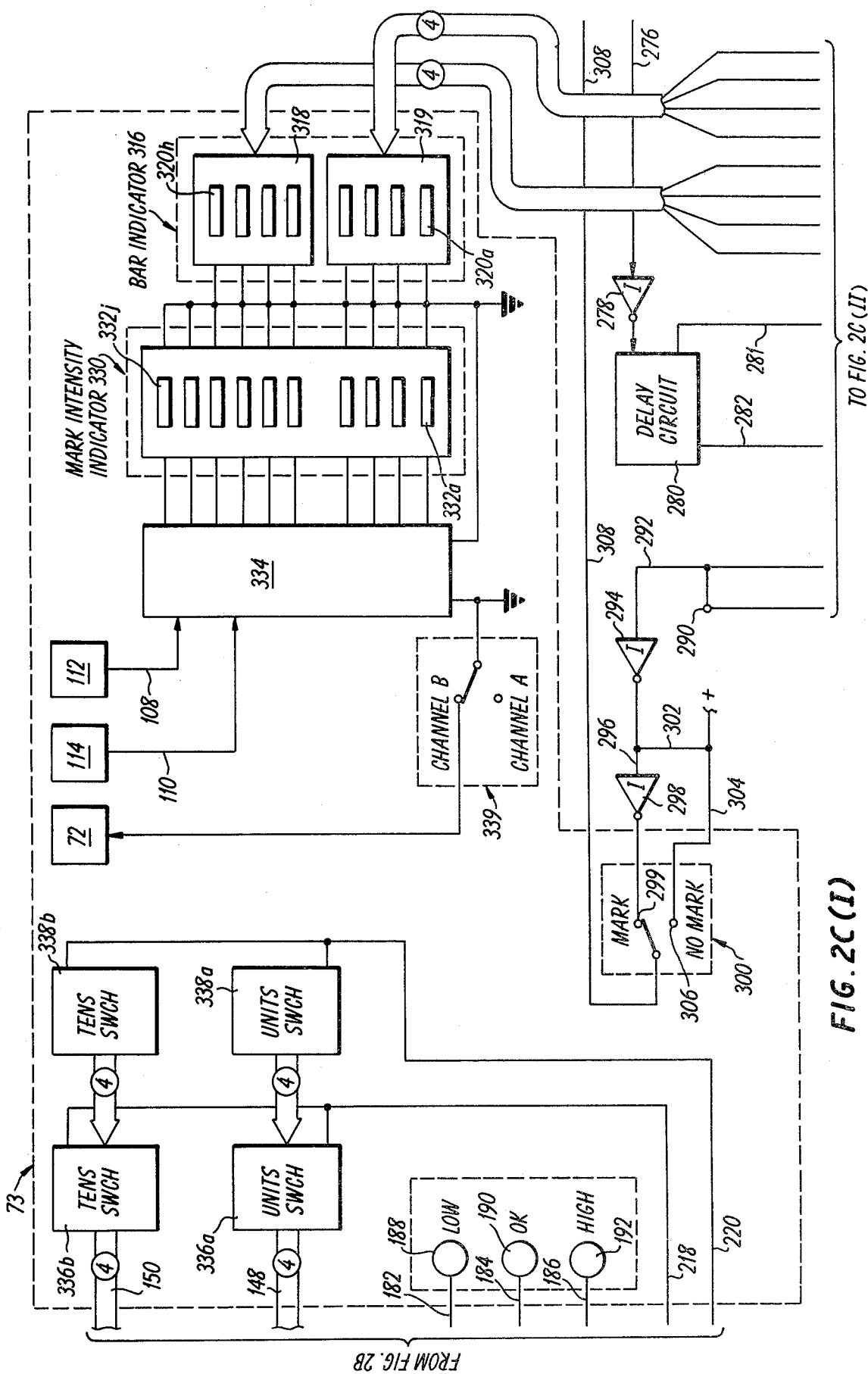

FIGS. 2B and 2C taken together show two separate indicia reading circuits 230A and 230B. For purposes of illustration, each indicia reading circuit is framed in broken lines. Since indicia reading circuit 230A is identical to indicia reading circuit 230B, the detail circuit elements are shown for circuit 230A only. In this regard, it should be understood that the circuits 230A and 230B are identical but are selectively utilized depending on whether probe 42A or 42B is in use. Hence, the ensuing discussion describes only circuit 230A but should be understood to describe circuit 230B as well. In this regard, when referring to various numbered leads which are received by the circuit 230A, it should be understood that leads carrying the same signal to circuit 230B are similarly numbered and in addition have the alphabetical suffix "B".

The circuit 230 comprises a NAND gate 232; and inverter 234; a "read" flip-flop 236; a "verify" flip-flop 238; a divide-by-sixteen counter 240; a "mark" flip-flop 242; a series shift register 244; a parallel shift register 246; and, display driver 248.

Considering now the connections of the elements comprising the circuit 230, a first input terminal of the NAND gate 232 is connected by a lead 250 to the output terminal of the inverter 200. A second input terminal of the NAND gate 232 is connected by a lead 252 to the terminal Q of the one-shot 62 (see FIG. 2A). The output terminal of the NAND 232 is connected to the inverter 234, whose output terminal is in turn connected by a lead 253 to the reset terminal R of the flip-flop 236.

A first control input terminal of the flip-flop 236 is connected to a connector pin 254 which is selectively hard-wired as hereinafter described. An output terminal Q of the flip-flop 236 is connected by a lead 255 to a first input terminal of the previously described NAND gate 64, the second input terminal of the NAND gate 64 being connected by the lead 100b to the output terminal of the inverter 200. The set terminal S of flip-flop 236 is connected by leads 170 and 168 to the output terminal of the inverter 158, which is ultimately connected in to the leading edge photosensor 46.

The "mark" flip-flop 242 has its set terminal S connected by leads 256 and 252 to the terminal Q of the one-shot 62 (see FIG. 2A). The reset R terminal of the "mark" flip-flop 242 is connected by leads 170 and 168 to the output terminal of the inverter 158, which is ultimately connected to the leading edge photosensor 46.

The "verify" flip-flop 238 has its reset terminal R connected by leads 166 and 164 to the output terminal Q of the leading edge one-shot 162. A control terminal of the "verify" flip-flop 238 is connected by a lead 258 to the "carry" output terminal of the counter 202. A second control input of the flip-flop 238 is connected by leads 260 and 255 to the output terminal Q of the flip-flop 236.

The divide-by-sixteen counter 240 of circuit 230 is connected by a lead 262 to the output terminal of the voltage to frequency converter 122. The counter 240 also receives a "preset" signal on a lead 264 connecting a "preset" terminal of the counter 240 to the terminal Q of flip-flop 236. An output terminal of the divide-by-sixteen counter 240 is connected by leads 266 to a control terminal of the "mark" flip-flop 242; by leads 266 and 268 to a control input terminal C of the flip-flop 236; and, by leads 266 and 270 to a clock input terminal of the series shift register 244.

In addition to having its clock input terminal connected to the counter 240 as described above, the series shift register 244 has its set terminal S connected to the terminal Q of the "mark" flip-flop 242. In addition, a "preset" terminal of the register 244 is connected by leads 166 and 164 to the terminal Q of the leading edge one-shot 210.

The series shift register 244 has a plurality of output terminals connected by corresponding leads 272a–272h to corresponding input terminals of the parallel shift register 246. Eight such leads 272 are shown, although not all of these leads may be utilized. In this respect, each lead 272 has thereon a connector pin 274, any one of which may be hard-wired to the connector pin 254 (which, as mentioned before, is connected to the control terminal D of flip-flop 236). If, for example, connector pin 274h is hard-wired to the connector pin 254 as shown, then the register 244 is adapted to have eight bits shifted therethrough. If, on the other hand, pin 274d were to be hard-wired to the pin 254, then only four bits will be shifted through the register 244.

The parallel shift register 246 has each of its input terminals connected by the leads 272a–272h to output terminals of the series shift register 244 in the above-described manner. In addition, a clock input terminal of the register 246 is connected to the collector assembly 17. In this respect, a lead 276 from the collector assembly 17 is connected to an inverter 278. The output terminal of the inverter 278 is connected to a delay circuit 280. The delay circuit 280 comprises three one-shot multivibrators connected in series. The output terminal of the first of these one-shots is connected by a lead 281 to the latching means 248 for serving as an immediate output strobe. The output terminal of the last of the one-shots in circuit 280 is connected by a lead 282 to the input clock terminal of the shift register 246.

The parallel shift register 246 has a plurality of output terminals (8 shown in the FIG. 2C embodiment) each of which corresponds to an associated input terminal. The output terminals of register 246 are connected by leads 284a–284h to corresponding input terminals of the driver 248.

In addition to having its input terminals connected as described above, the driver 248 also receives a strobe signal on a lead 286 which connects the clock input terminal of the driver 248 to the terminal Q of the "verify" flip-flop 238. Moreover, the driver 248 has a plurality of output terminals, each of which corresponds to one of its input terminals. Each output terminal is connected by a unique lead to a connector pin 288. Again, eight such connector pins 288a–288h are shown.

Having above described the circuit 230, the discussion of which is applicable for both circuits 230A and 230B, it is now mentioned that one of the connector pins 272 of either circuit 230A or 230B is to be hard-wired to a connector pin 290. The choice of which connector pin 272 is to be wired in this fashion determines which of the segments in the indicia 36 indicate whether the document being read is the first document in a group of related documents, or whether the document is merely an "overflow" document. For example, if connector pin 274d is hard-wired to the connector pin 290, then segment 39d of the indicia 36 would indicate whether the document being read were the first document in a group (such as a group of documents associated with a particular customer, for example). The connector pin 290 is connected by a lead 292 to an inverter 294. The output terminal of the inverter 294 is connected by a lead 296 to a second inverter 298 the output terminal of which is connected to the operator's console 73 and to a terminal 299 of a switch 300. The output terminal of the inverter 294 is also connected by leads 302 and 304 to a terminal 306 of the switch 300. The switch 300 is manually activated to contact terminal 299 if the type of documents being read use the presence of an informational mark in the selected segment of the indicia 36 to indicate that the document is the first document of a group of documents. On the other hand, if the absence of an informational mark in the selected segment of the indicia 36 is used by the documents being read to indicate that the document is the first document of a group, then the switch 300 is activated to contact the terminal 306. In either event, once contact is achieved an appropriate signal is carried by lead 308 to portions of the document handling machine, such as collector assembly 17, which require knowledge of whether a first document for a new group of documents has been read.

FIG. 2C further illustrates a bank 308 of connector pins, the pins of bank 308 being selectably hard-wired to either the connector pins 288 of circuit 230A or similar pins 289 in the circuit 230B. In this regard, eight such connector pins are associated with bank 308.

The connector pins of bank 308 are connected to the operators console 73 and particularly to an indicia bar indicator 316 portion thereof. In this respect, the indicia bar indicator 316 has two banks 318,319 of displays, each bank having four indicator means (such as LED's 320a–320d, 320e–320h associated therewith). In this respect, connector pin 308a is connected by a lead 322a to the LED 320a, connector pin 308b by lead 322b to the LED 320b, and so on.

The operator's console 73 of FIG. 2C also comprises a mark intensity indicator 330 which comprises an array of indicators, such as LED's 332a–332h. The LED's 332 are connected in parallel to a bar display driver 334. Bar display driver 334 is connected via lead 110 to connector 114, and lead 108 and connector 112, to the metering sample and hold circuit 96 of FIG. 4.

The operator's console 73 further includes two sets 336 and 338 of thumb wheel switches. The first set 336 is used to select the approximate number of print lines which are known to separate the leading edge 34 of a document 30 from the gate mark 38 in the indicia field 36 for similar documents. Switch set 336 includes two switches: a units switch 336a and a tens switch 336b.

The second set 338 of thumb wheel switches is used to set the expected overall length (in print lines) of the document being read. The switch set 338 also includes a unit switch 338a and a ten switch 338b.

The output terminals of the switches 336a and 338a are connected by the four-lead bus 148 to the "units" comparator 128 (see FIG. 2B). Likewise, the switches 336b and 338b are connected by the four-lead bus 150 to the "tens" comparator 130.

Enablement input terminals of the switches 336a and 336b are connected by the lead 218 to a first output terminal of the flip-flop 208. In much the same manner, enablement input terminals of the switches 338a and 338b are connected by the lead 220 to the second output terminal of the flip-flop 208.

The operator's console 73 further includes a switch 339, selective actuation of which determines whether the probe 42A in conjunction with the circuit 320A of channel A, or the probe 42B in conjunction with the circuit 320B of channel B, is being monitored. Switch 339 lies between connector 72 and circuit 334.

Figure 4:
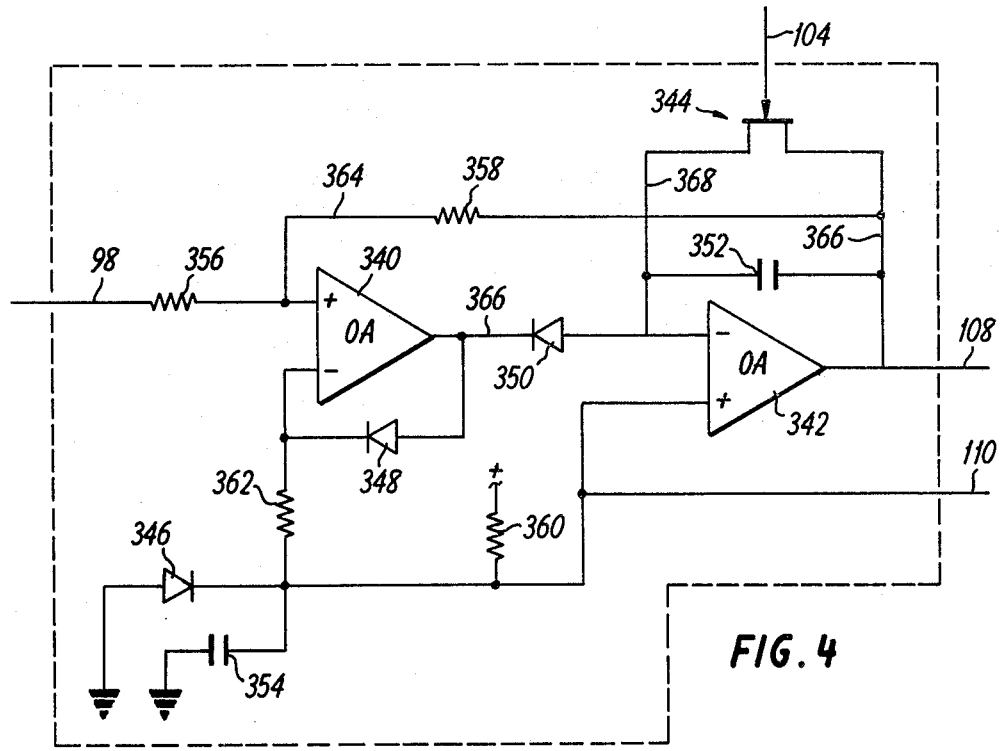
FIG. 4 is a circuit diagram depicting an embodiment of circuit subelements comprising FIG. 2A.

The metering sample and hold circuit of FIG. 4 comprises a first comparator 340; a second comparator 342; an analog switch 344; diodes 346 (Zener), 348, and 350; capacitors 352 and 354; and, resistors 356, 358, 360, and 362. Lead 98 connects the positive-going input terminal of the comparator 340 through the resistor 356 to the analog switch 94. The positive-going input terminal of the comparator 340 is also connected by lead 364 (having resistor 350 thereon) and lead 366 to the output terminal of the comparator 342. The output terminal of the comparator 340 is connected by lead 366 (having diode 350 thereon) to the negative-going input terminal of the comparator 342. The negative-going input terminal of the comparator 342 is also connected by lead 368 to a first terminal of the analog switch 344. The second terminal of the analog switch 344 is connected by the lead 366 to the output terminal of the comparator 342. The lead 104 from the one-shot 106 is also connected to the analog switch 344. Regarding suggested values for the compacitances and resistances of circuit of FIG. 4, compacitor 352 is chosen as 0.47 microfarads, compacitor 354 is chosen as 0.47 microfarads, resistor 356 is chosen as 51K, resistor 358 as 51K, resistor 360 is 470, and resistor 362 is 22K.

Figure 6:
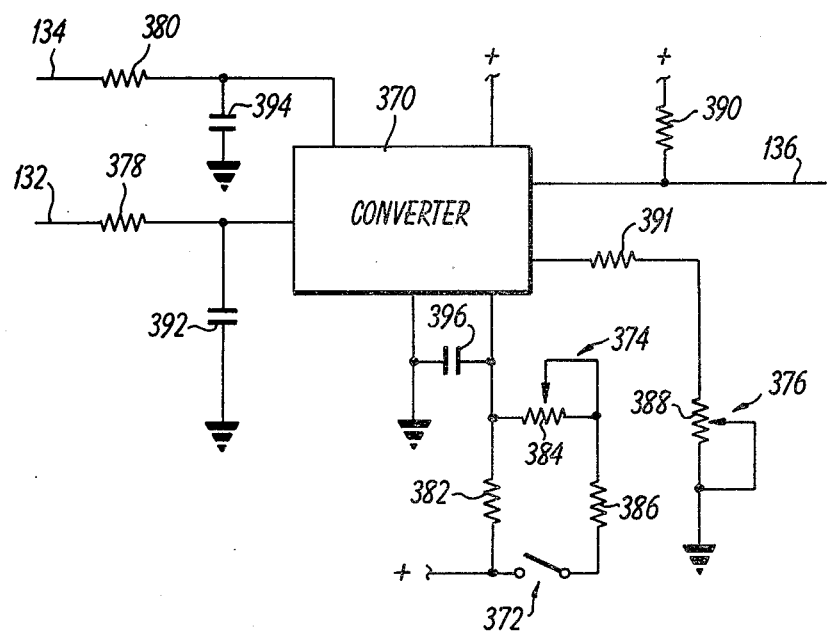

FIG. 6 is a detailed circuit diagram depicting the voltage to frequency converter 122 of FIG. 2B. In particular, the converter 122 comprises an integrated circuit 370 having a first input terminal connected by lead 132 to the tachometer 120 and a second input terminal connected by the lead 134 to the tachometer 120.

The integrated circuit 370 comprises voltage comparison means, monostable multivibrator means, and a precision switched current source. A suitable circuit 370 is manufactured by Fairchild as part no. 4151.

The converter further includes a switch 372; a first potentiometer 374; and, a second potentiometer 376. The integrated circuit 370 produces sixteen digital pulses per each print line of paper travelling through the document handling machine. In this respect, the tachometer 120 determines the rotational velocity of the roller blank and supplies a voltage indicative thereof to the circuit 370. At a speed corresponding to eighty inches per second paper travel, for example, the tachometer 120 generates 7.3 volts DC current. With this input voltage supplied the circuit 370, the circuit 370 produces a frequency corresponding to sixteen pulses per print line of document travel. In doing so, however, the circuit 370 must know whether the documents being read have six print lines per inch or eight print lines per inch. In this respect, when the switch 372 is open, the integrated circuit 370 is producing a frequency of 7.680 KHz (assuming maximum speed) for documents having six print lines per inch. When switch 372 has closed, however, the same sixteen pulses per line are generated for documents having eight print lines per inch (10.24 KHz assuming maximum speed). These frequencies may be trimmed by potentiometer 374. Moreover, the potentiometer 376 connected to an input terminal of the integrated circuit 370 permits the output frequency of the circuit 370 on line 136 to be adjusted to take into consideration changes in roller diameter by such factors as ink-buildup, wear, and the like. With respect to the values for the capacitances and resistances of FIG. 6, the following are suggested: R378=100K, R380=100K, R382=12K, R384=10K, R386=33K, R388=5K, R390=3.3K, R391=12K, C392=0.1 microfarad, C394=0.1 microfarad, and C396=0.0047 microfarad.

OPERATION

The operation of the indicia reading apparatus will now be discussed with reference to a document such as document 30 of FIG. 1. For purposes of the discussion, it is assumed that document 30 belongs to a batch of documents which typically have a gate mark 38 at a distance approximating ten print lines from the document leading edge 34 (i.e. distance 40 approximates ten print lines); that the entire document from leading edge 34 to trailing edge (not shown) is approximately eleven inches with six print ines occurring per inch; and, that the indicia on the document resembles indicia 36 on document 30.

Several preliminary steps are included to prepare the indicia reading apparatus for handling the document 30 described immediately above:

1. Switch 372 in the voltage to frequency converter 122 (see FIG. 6) should be open since the document 30 has six print lines per inch.

2. The thumb wheel switches 336a,336b and 338a,338b on console 73 should be appropriately set. Since the expected distance from the leading edge 34 of the document to the gate mark 38 is approximately ten print lines, switch 336a should be set at zero and switch 336b should be set at one. Since the entire document length is expected to be 66 print lines, both swtiches 338a and 338b should be set at six.

3. Switch 339 on console 73 should be set to "channel A". From FIG. 1 it is evident that the indicia 36 resides in a part of document 30 which will travel under probe 42A. Moreover, it should be remembered that the probes 42 can be translated in the direction of arrow 41, as well as in the direction of arrow 32, should the need arise.

4. Pin 254 connected to flip-flop 236 in circuit 230A is hard-wired to an appropriate pin 274. In this respect, it will be recalled that pins 274 are on leads 272 extending from the output terminals of the shift register 244. For the case being discussed, pin 272h is hard-wired to the pin 254 since eight segments occur in the indicia 36.

5. Pin 290 of FIG. 2C is hard-wired to an appropriate pin 272. As explained above, the particular pin 272 to which pin 290 is wired determines which indicia segment 39 will be used as an indication of whether the document 30 is a first document in a group of documents or an "overflow" input document belonging to a previous group.

6. Pins 288 of circuit 230A are hard-wired to pins 308 since signals from channel A and its associated circuit 30A are to be fed through the operator's console 73. (Had channel B been utilized, pins 289 would have been hard-wired to pins 308).

Motion is imparted to the document 30 by the continuously running input rollers 12. The document 30 travels through the rotating burster rollers 14 towards the folding means 16. After going through the burster rollers 14, but before being folded by the folding means 16, document 30 passes under the read station 22. In this respect, as the leading edge 34 of document 30 goes through the station 22, the leading edge 34 interrupts the radiant energy beam (such as from lamp 48) incident on photoelectric sensor 46.

Interruption of the radiant energy incident upon photocell 46 causes a low signal on lead 152. The low on lead 152 is inverted to a high signal on lead 160 to trigger the one-shot 162. This high signal is also inverted by inverter 158 (to which it is applied by lead 156). The low signal produced at the output terminal of the inverter 158 is applied to the reset terminal R of counter 124 substantially throughout the time the document 30 is in the read station 22. The low signal applied to the reset terminal R of counter 124 enables the counter 124 to function as described below.

All the while the rollers 12, 14, and 16 have been rotating, the tachometer 120 has been generating a voltage signal proportional to the rotational velocity of the first folder roller 16a. It should be noted the burster rollers 14 are coupled to the first set of folding rollers 16a so that the two sets of rollers are rotating at substantially the same speed. The tachometer 120 is mounted to be driven by the rollers 16a and, in providing a signal indicative of the rotational velocity of the roller 16a, also provides a signal indicative of the speed of the document 30. This voltage signal is applied on leads 132,134 to the voltage to frequency converter 122. The components of the voltage to frequency converter 122 (discussed in detail above with reference to FIG. 6) produce a frequency corresponding to 16 pulses per print line of paper travel through the read station 22.

The pulse digital signal generated by the voltage to frequency converter 122 is applied to the divide-by-sixteen counter 124 via lead 136. Counter 124 only starts to tabulate these pulses once a low signal is applied to its reset terminal R as described above. When the counter 124 is enabled to count, one pulse is seen at its output terminal for every 16 pulses applied to its input terminal from the converter 122.

The two decade counter 126 tabulates pulses generated by the counter 126. The tabulated count is compared with a value indicated by numbers selected on thumb wheels 336a,336b. In this regard, when the one-shot 162 was triggered as described above, a signal from terminal $\overline{Q}$ on lead 210 caused the flip-flop 208 to produce a high signal on lead 218, which in turn enabled switches 336a,336b to put their signals on busses 148, 150 respectively, to comparison means 128, 130 respectively.

As long as the comparison means 128 indicates that the number of print lines counted by the two decade counter 126 is less than the value represented on switches 336a,336b, a high signal appearing at a "less than" terminal of comparator 128 is applied to the driver 172 for driving a display lamp 188.

When the comparator means 128 indicates that the number of print lines counted by the counter 126 is equal to the value represented on switches 336a,336b, a high signal occurs at an "equal to" terminal of the comparator 128 and is applied to the driver 174 for driving display lamp 190. Also, the high signal at the "equal to" input terminal of comparator 128 is applied via lead 178 to trigger the one-shot 194. Firing of the one-shot 194 at its terminal Q sets the flip-flop 196. As a result, the Q terminal of flip-flop 196 goes high, and applies a high signal to counter 202 to remove the low-activated preset condition at terminal $\overline{P}$ of the counter 202.

Having found an expected neighborhood of the indicia 36, the probe 42 should now start looking for the indicia 36, and particularly for the gate mark 38. In this respect, as mentioned above, although the counter 202 is a 16 bit counter, the counter 202 has been preset to 13 (via various terminal configurations not illustrated). That is, counter 202 can now count from 13 to 14, 15, and 16. Counter 202 is incremented by a signal on lead 204 from the output terminal of the divide-by-sixteen counter 124. In effect, then, counter 202 can count up to three more print lines beyond the preselected number (in our case "10") on thumb wheels 336a,336b in search of a gate mark 38. It should be understood, of course, that the size of the window in which the counter 202 permits the probe 42 to expand its search can be varied by changing the preselected value applied to the counter 202.

For purposes of the current example, suppose that the gate mark 38 does not necessarily appear at print line 10, but at print line 12 instead. The counter 202 begins to count, applying a high signal via lead 258 to the "verify" flip-flop 238. Moreover, while the counter 202 is counting, the terminal $\overline{Q}$ of flip-flop 196 has a low signal which is inverted by inverter 200 to a high signal. The high signal at the output terminal of inverter 200 accomplishes several things:

1. It enables NAND 232 so that the "read" flip-flop 236 may be reset only while the counter 202 is counting.

2. It is inverted by inverter 201 to a low signal which is applied to NAND gate 64A. Since NAND 64A is wired negative or, the one-shot 62A is enabled by a high signal at its terminal A.

3. It enables analog switch 94 via switch 102.

4. It triggers meter display one-shot 106.

While the counter 202 is counting the number of print lines passing under the probe 42A, sensor 44A in conjunction with the preamplifier A is reading the document 30 to detect any change in the intensity in energy received from the source 48A. In this respect, any negative-going signal less than 4.6 volts at the comparator 54A will provide a high output signal therefrom and trigger the one-shot 62A. This happens in the above example when the sensor 44A encounters print line 12. A high pulse on the lead 252A results from the triggering of the one-shot 62A. This high pulse sets the "mark" flip-flop 242 and is used to reset the "read" flip-flop 236.

Prior to the sensor 44A reading the gate mark 38, the divide-by-sixteen binary counter 240 had been preset to eight. This was done by a low signal on lead 264 and a high signal jammed to an input pin not shown. When reading the gate mark reset the flip-flop 236, this preset was removed to enable the counter 240. The counter 240 is then incremented, the input to the counter 240 being the sixteen pulses per print line signal from the voltage to frequency converter 122. The counter 240 starts counting at the preset eight, and produces a carry output at terminal $\overline{CA}$ eight pulses or one-half print line later. The counter 204 continues counting to provide carry signals every sixteen pulses or every print line. Thus, a new line clock is generated on lead 266 based on the position of the gate mark 38.

The line clock on lead 266 is used to toggle the "mark" flip-flop 242, the "read" flip-flop 236, and the eight stage serial shift register 244. The first clock pulse moves the gate mark 38 information from the "mark" flip-flop 242 into the register 244 where it will appear at an output pin to which lead 272a is connected. Successive clocks move the information through the register 244 until the gate mark 38 is in the final stage at an output pin to which lead 272h is connected. As mentioned before, the number of indicia segments 39 to be scanned is programmed by wire wrap pins 274 at the output of the shift register 244 and pin 254 at the input terminal D of the "read" flip-flop 236. When the gate mark 38 is clocked from the register 244 into the "read" flip-flop 236, reading will be terminated. To read segments 39 for the eight print lines following the gate mark 38, lead 272h connected to register 244 is wired to pin 254. When the gate mark 38 is in the "read" flip-flop 236, the following eight segments of information are in the register 244 and thus reading is complete for this document 30.

Since any of the indicia segments 39 following the gate mark 38 may be used to indicate that the document 30 is a first document in a new group of documents (information which may be useful to the collector assembly 17, and particularly the upper collector 18 which may retain such a first document in a new group), the pins 274 on the output of the serial register 244 and the pin 290 are used to define the particular marked segment 39 containing such an indication. As mentioned before, since segment 39d indicates that the document 30 of FIG. 1 is a first document in a new group of documents, pin 274d is wired to pin 290.

The signal on pin 290 is inverted at inverter 294 and again at 298. Switch 300 selects either the true or inverted level of the signal on pin 290 so that an "overflow" page may be identified by a mark or its absence. The signal level on lead 308 is sampled by the upper collector 18 at the trailing edge of the document and, if low, will cause the document 30 to be retained in the upper collector 18.

Whenever the lower collector 20 dumps a group of documents on an insert track (not illustrated), a signal from the collector 20 is applied to lead 276 and inverted at 278. The delay circuit 280 provides an immediate output strobe on lead 281 to driver 248 and a delayed clock on lead 282 to the register 246. The clock on 282 enters information from register 244 into register 246 as the document 30 moves from the upper collector 18 into the lower collector 20. The information in the register 246 is then applied to driver 248 and made available at program pins 288a–288h. The provision of pins 288 permits any segment location or combination of the same to be wire programmed to any of the pins 308a–308h.

Two analog signals taken from the probes 44A and 44B on leads 88 and 86, respectively, are taken to analog switches 84 and 80, respectively. Switches 80 and 84 are controlled by the metering channel select switch 339 via the two inverters 74 and 76 to determine which channel is monitored. The analog switch 94 determines when the input mark signal is monitored. With the run set switch 102 open as shown, a high on lead 100a closes the analog switch 94.

Two operational amplifiers 340,342 on lead 100a are connected as an inverting sample and hold peak detector. The peak storage capacitor 352 is normally shorted by an analog switch 344. With the meter switch 102 open, the output terminal of operational amplifier 342 will follow the analog input signal from the mark preamplifier 50 for any value below the 5.6 volt reference.

When the meter switch 102 is closed, the signal on lead 100b is applied via lead 100a to both the input analog switch 94 (to allow sampling of the input signal during this time only) and the meter display one-shot 106 (to permit capacitor 352 to charge to the peak signal and remain charged for approximately 0.1 second). The output terminal of the operational amplifier 392 and the 5.6 volt reference are connected to the bar display driver 334 on the console 73. Full scale readout (meaning that all ten bars or LED's 332 are lit) is generated by a two-volt mark signal amplitude which may be operator adjusted by potentiometer (not shown) in the preamplifier 50. In this manner, any mark occuring within the three line neighborhood of the indicia 36 is displayed and the mark signal amplitude adjusted while the machine is in operation.

While the invention has been particularly shown and described with reference to the preferred embodiments thereof, it will be understood by those skilled in the art that various alterations in form and detail may be made therein without departing from the spirit and scope of the inventional. The embodiments of the invention shown in which an exclusive property or priviledge is claimed are defined as follows.

What is claimed is:

1. A method of reading indicia on documents travelling past a read station, said documents having thereon a number of print lines, said method comprising the steps of:

detecting the presence of a document in said read station;

determining when an indicia-bearing portion of said travelling document is in a position to be read, said determination further comprising the steps of:

generating a digital signal having a pulse frequency proportional to the speed of travel of said document;

counting with a first counter means the number of said pulses as an indication of the number of printing lines that are passing through the read station;

maintaining a second counter means in a selective present condition until said second counter means is enabled to count, said second counter means having a maximum value to which it can count so that its range of counting from a preset count to a maximum count is controllable;

comparing the counted number of said pulses counted by said first counter means to a pre-selected value, said pre-selected value approximating the number of print lines typically distancing a neighborhood of the indicia-bearing portions of similar documents from an edge of similar documents; and, enabling said second counter means to count further ones of said pulses when it is determined that the number of pulses counted by said first counter means equals said preselected value, said counting by said second counter means commencing from said preset count;

scanning a number of further consecutive print lines on said document for an initial information mark signaling the beginning of said indicia, the number of print lines so scanned being related to the counting range of said second counter means; and, reading at least one further print line of said indicia-bearing portion of said document.

2. The method of claim 1, wherein said generation of a digital signal having a pulse frequency proportional to the speed of travel of said document further comprises the steps of:

detecting the speed of means adapted to impart motion to said travelling document;

generating a voltage signal proportional to the speed of said motion imparting means; and, converting said voltage signal to a digital signal having a pulse frequency proportional to the speed of said motion imparting means.

3. The method of claim 2, wherein said motion imparting means comprises rotatable roller means, and wherein a tachometer is used to detect the rotational speed of said roller means.

4. The method of claim 3, further comprising the step of:

calibrating the voltage signal generated to be proportional to the rotational speed of said roller means, said calibration facilitating compensation for changes in the diameter of said roller means.

5. The method of claim 2, wherein the ratio of the pulse frequency to the number of print lines travelling past the read station per second is approximately 16:1.

6. The method of claim 1, wherein said read station comprises a plurality of reading means, each of said reading means positioned to have only a portion of said document to travel thereby, further comprising the step of:

selecting an appropriate reading means to read said indicia in accordance with the relative positioning of said indicia-bearing portion of said document on said document.

7. The method of claims 1 or 6, wherein said reading means comprises photoelectric means.

8. The method of claim 1, further comprising the step of:

analyzing the readable quality of said indicia.

9. Apparatus for reading indicia on documents travelling past a read station, said documents having thereon a number of print lines, said apparatus comprising:

means for imparting motion to said travelling documents;

means for detecting the presence of a document in said read station;

means for determining when an indicia-bearing portion of said travelling document is in a position to be read by said reading means, said determination means further comprising:

means for generating a digital signal having a pulse frequency proportional to the speed of travel of said document;

first counter means for counting the number of said pulses as an indication of the number of print lines that are passing through the read station;

second counter means, said second counter means being selectively presettable until said second counter means is enabled to count, said second counter means having a maximum value to which it can count so that its range of counting from a preset count to a maximum count is controllable; and, means for comparing the counted number of said pulses counted by said first counter means to a pre-selected value, said pre-selected value approximating the number of print lines typically distancing a neighborhood of the indicia-bearing portions of similar documents;

means for enabling said second counter means to count further ones of said pulses when it is determined that the number of pulses counted by said first counting means equals said pre-selectd value, said counting by said counting means commencing from said preset count;

means for scanning a number of further consecutive print lines on said document for an initial information mark signalling the beginning of said indicia, the number of print lines so scanned being related to the counting range of said second counter means; and, means for reading at least one further print line of said indicia-bearing portion of said document.

10. The apparatus of claim 9, further comprising:

means for detecting the speed of the motion imparting means adapted to impart motion to said travelling documents;

means for generating a voltage signal proportional to the speed of said motion imparting means; and, means for converting said voltage signal to a digital signal having a pulse frequency proportional to the said motion imparting means.

11. The apparatus of claim 10, wherein said motion imparting means comprises a rotatable roller, and wherein a tachometer is used to detect the rotational speed of said roller.

12. The apparatus of claim 11, further comprising means for calibrating the voltage signal generated to be proportional to the rotational speed of the roller to compensate for changes in the diameter of said roller.

13. The apparatus of claim 9, wherein said read station comprises a plurality of reading means, each of said reading means positioned to have only a portion of said document to travel thereby.

14. The apparatus of claims 9 or 13, wherein said reading means comprises photoelectric means.

15. The apparatus of claim 9, further comprising:

means for analyzing the readable quality of said indicia.

16. The method of claim 1 wherein the step of reading at least one print line comprises the steps of:

obtaining a digital informational signal with respect to the status of informational marks on each such print line; and, using pulses related to the speed of travel of said document to clock said digital informational signals into a storage means.

17. The method of claim 16, further comprising the steps of:

displaying an indication of the status of each of said information marks.

18. The method of claim 16, further comprising the steps of:

designating a print line included in said indicia-bearing portion as being indicative that said document is the first document of a group of related documents;

reading the presence or absence of an informational mark in said designated print line;

generating and supplying a signal to a document handling machine having a plurality of collectors, said machine adapted to temporarily retain in a first collector thereof a document belonging to a new group of documents, said signal being generated in accordance with the presence or absence of said informational mark in said designated print line and selectively enabling said first collector to retain said document therein.

19. The method of claim 16 wherein said step of using pulses to clock said digital informational signals into said storage means comprises the steps of:

enabling a third counting means to count pulses related to the speed of travel of said document, said third counting means having been preset to a selective preset count and maintained at said preset count until said initial information mark was located, said third counting means having a maximum value to which it can count so that its range of counting from a preset count to a maximum count is controllable, said third counting means producing a carry signal whenever said maximum count is reached, said range of said third counting means being such that a carry signal is produced to correspond with the passage of each print line through said read station; and, using said carry signal as a clocking signal to gate said digital informational signals into said storage means.

20. The apparatus of claim 9, wherein the means of reading at least one print line comprises:

means for obtaining a digital informational signal with respect to the status of informational marks on each such print line; and, means for using pulses related to the speed of travel of said document to clock said digital informational signals into a storage means.

21. The apparatus of claim 20 wherein said means for using pulses to clock said digital informational signals into said storage means comprises:

third counting means having been preset to a selective preset count and maintained at said preset count until said initial information mark is located, said third counting means having a maximum value to which it can count so that its range of counting from a preset count to a maximum count is controllable, said third counting means adapted to produce a carry signal whenever said maximum count is reached, said range of said third counting means being such that a carry signal is produced to correspond with the passage of each print line through said read station, said carry signal being used as a clocking signal to gate said digital informational signals into said storage means.

22. The apparatus of claim 21, further comprising:

means for displaying an indication of the status of each of said information marks.

23. The apparatus of claim 21, wherein said indicia comprises a plurality of information marks contained in sequential print lines subsequent to a print line containing said initial information mark, one of said print lines included in said indicia-bearing portion being designated as an indication of whether the document is the first document of a group of related documents, said apparatus further comprising:

means for generating a signal in accordance with the presence or absence of an informational mark in said designated print line, said generated signal being supplied to a document handling machine having a plurality of collectors, said machine adapted to temporarily retain in a first collector thereof a document belonging to a new group of documents, said signal selectively enabling first collector to retain said document therein.

* * * * *

UNITED STATES PATENT AND TRADEMARK OFFICE
CERTIFICATE OF CORRECTION

PATENT NO. : 4,442,347

DATED : April 10, 1984

INVENTOR(S) : Kenneth A. Hams

It is certified that error appears in the above-identified patent and that said Letters Patent is hereby corrected as shown below:

Column 3, Line 9, correct the spelling of "depicting".

Column 5, line 1, correct the spelling of "multivibrator".

Column 5, line 47, change "bus" to -- buses --.

Column 9, line 43, change "compacitances" to read -- capacitances --.

Column 14, line 23, correct the spelling of "occurring".

Column 14, line 32, change "inventional" to read -- invention --.

Column 18, line 25, correct the spelling of "designating".

Signed and Sealed this

Twenty-fifth Day of December 1984

[SEAL]

Attest:

GERALD J. MOSSINGHOFF

Attesting Officer

Commissioner of Patents and Trademarks